United States Patent [19]
Rose et al.

[11] Patent Number: 5,765,124
[45] Date of Patent: Jun. 9, 1998

[54] TIME-VARYING FEATURE SPACE PREPROCESSING PROCEDURE FOR TELEPHONE BASED SPEECH RECOGNITION

[75] Inventors: Richard C. Rose, Somerset; Alexandros Potamianos, Scotch Plains, both of N.J.

[73] Assignee: Lucent Technologies Inc., Murray Hill, N.J.

[21] Appl. No.: 581,951

[22] Filed: Dec. 29, 1995

[51] Int. Cl.$^6$ .................................. G10L 5/06; G10L 9/00
[52] U.S. Cl. ........................ 704/242; 704/233; 704/226
[58] Field of Search ........................ 395/2.51, 2.42, 395/2.35; 704/242, 233, 226

[56] References Cited

PUBLICATIONS

Anastasakos et al, Adaptation to new microphones using tied–mixture normalization, ICASSP, Apr. 1994.

Acero, A, Stern R M, Robust speech recognition by normaliz. of the acoustic space, ICASSP, May 1991.

Kao, Y. H. et al, Toward Vocabulary Independent Telephone Speech Recognition, ICASSP, Apr. 1994.

Lerner S., Mazor, B., Telephone Channel Normalization for Autom. Speech Recog., ICASSP, Mar. 1992.

*Primary Examiner*—Allen R. MacDonald
*Assistant Examiner*—Robert Louis Sax

[57] ABSTRACT

An improved speech recognition system, in which transformation process parameters are generated in response to selected characteristics derived from speech inputs obtained from both carbon and linear microphones. The transformation process parameters are utilized in conjunction with selected digitized speech models to improve the speech recognition process based on the carbon microphone property of suppressing speech spectral energy for low energy invoiced sounds, and also for low energy regions of the spectrum between formant peaks for voices sounds.

10 Claims, 3 Drawing Sheets

FIRST PASS:

SECOND PASS:

TIME-VARYING FEATURE SPACE PREPROCESSING PROCEDURE FOR TELEPHONE BASED SPEECH RECOGNITION

FIELD OF THE INVENTION

The instant invention relates generally to speech recognition and, more particularly, to method and apparatus for improving recognition based on the generation of transformation process parameters which suppress speech spectral energy for low energy unvoiced sounds, and also for low energy regions of the spectrum between formant peaks for voiced signals.

BACKGROUND OF THE INVENTION

Speech recognition is a process by which one or more unknown speech utterances are identified. Speech recognition is generally performed by comparing the features of an unknown utterance, with the features of known words, phrases, lexical units and/or strings, which are often referred to as "known words." The unknown speech utterance is typically represented by one or more digital pulse code modulated ("PCM") signals. The features, or characteristics of the known words, are typically defined through a process known as training, and in conjunction with apparatus known as speech recognizers.

Speech recognizers typically extract features from the unknown utterance in order to characterize the utterance. There are many types of speech recognizers, such as, for example, conventional template-based and Hidden Markov Model ("HMM") recognizers, as well as recognizers utilizing recognition models based on neural networks.

It is, of course, understood that audio input to any speech recognition system must first pass through a transducer such as a carbon or linear (electret) microphone. Such transducers introduce distortion into the audio signal, which distortion may have an adverse (or in some cases a beneficial) effect on the recognition process. It is known, for example, that carbon transducers suppress certain speech information which heretofore has been deemed a reason to minimize use of carbon transducers in speech recognition systems. However, when utilizing speech recognition in the telephone network, the use of carbon transducers cannot be avoided, as it is estimated that fifty (50%) percent of existing telephones utilize carbon transducers.

Advantageously, the instant invention recognizes that certain characteristics inherent in carbon transducers are in fact beneficial to speech recognition, particularly in the telephone system, when properly identified and utilized. The instant invention makes use of these characteristics to improve the speech recognition process.

SUMMARY OF THE INVENTION

In accordance with the present invention, method and apparatus is described which provides improved speech recognition by essentially suppressing information in those regions of the speech signal where the signal variability is high, or the modeling accuracy is poor.

More particularly, the invention takes advantage of the fact that one type of microphone, such as the carbon microphone, suppresses speech spectral energy for low energy unvoiced sounds, and also for low energy regions of the spectrum between formant peaks for voiced sounds. This observation is utilized in the invention described below to improve speech recognition for various types of microphones, including the carbon and linear (electret) microphone.

HMM digit models trained from carbon utterances are used by a Viterbi decoder, with the output of the Viterbi decoder utilized in a process parameter generator to generate a set of transformation process parameters. Also applied to the process parameter generator are speech utterances obtained from the outputs of both carbon and linear microphones. The output of the process parameter generator is a carbon-linear transformation process parameter, which parameter is indicative of certain significant differences in the properties of carbon and linear microphones.

The transformation process parameter is then combined with HMM digit models trained from combined linear-carbon speech via a Viterbi decoder and a speech utterance from a carbon microphone to generate a transformed speech observation vector.

This vector is in turn applied to a speech recognizer in combination with the HMM digit models trained from combined linear-carbon speech to produce a recognized word string.

DETAILED DESCRIPTION

Figure 1A:
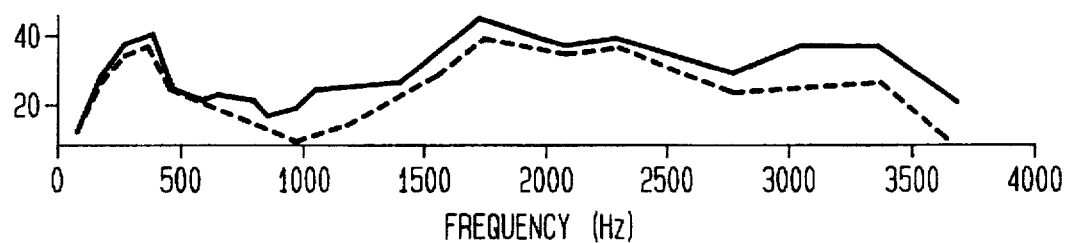
FIG. 1 illustrates examples of smoothed spectral envelopes taken from individual frames of speech for a single speaker utilizing a carbon and electret transducer.
Figure 1B:
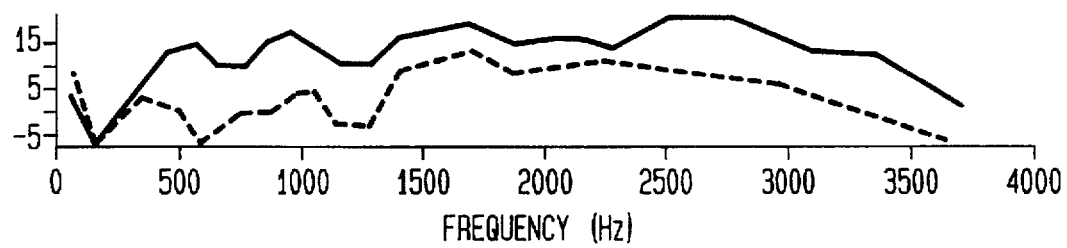
Figure 1C:
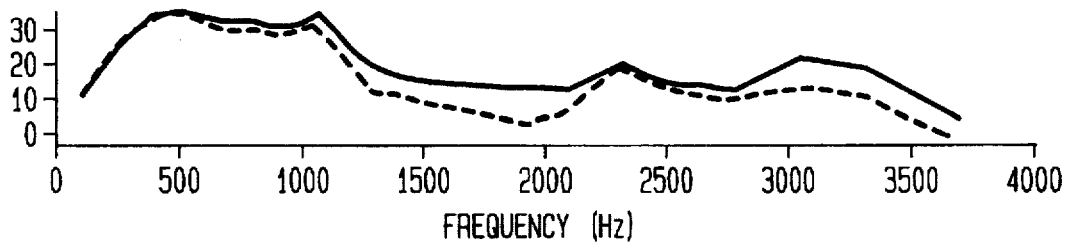

It has been found that the use of a carbon microphone suppresses speech spectral energy for low energy unvoiced sounds, and also for low energy regions of the spectrum between formant peaks for voiced sounds. This is illustrated by the plots in FIG. 1. More particularly, FIG. 1 shows examples of smoothed spectral envelopes taken from individual frames of speech for a single speaker, through an electret transducer (solid line), and a carbon transducer (dotted line) simultaneously. The three plots depict filter bank envelopes for the sounds, corresponding to phonetic symbols of "/iy/," "/ah/," and "/s/" respectively, shown in FIGS. 1A, 1B and 1C. From the foregoing, it has been determined that the use of certain characteristics of a carbon transducer can be useful in speech recognition.

Support for the proposition that the transformation introduced by a carbon transducer is beneficial to obtain improved speech recognition is given in Table 1 below.

TABLE I

Error Rate (Per Digit)

| Training Condition: | Testing Condition | |
|---|---|---|
| | Carbon | Electret |
| Carbon | 1.3% | 4.1% |
| Electret | 1.6% | 2.4% |
| Combined | 1.3% | 2.8% |

The data shown in Table I, was obtained from an AT&T Bell Laboratories speech database, where voice samples were recorded from subjects recruited in a mall and stored in the database. The speech database contained connected digit utterances spoken over the telephone network with the speech being stored in directories per speaker labeled as either speech originating from a carbon or electret transducer. Utterances utilized to create the data in Table I consisted of 1–7 digits spoken in a continuous manner. Training data consisted of 5,368 utterances (16,321 digits) from 52 speakers. Testing data consisted of 2,239 utterances (6,793 digits) from 22 speakers. Five dialect regions were available: Long Island, Chicago, Boston, Columbus and Atlanta. The data in Table 1 utilized the Columbus dialect region.

Known hardware and software was used for the speech recognition process that generated the data in Table I, which hardware and software consisted of a front end processing system that computed cepstrum coefficients from a smooth spectral envelope. Also utilized was the Bell Laboratories Automatic Recognition System (BLASR™), which is a Hidden Markov Model (HMM) based system, and a Viterbi decoder/recognizer. Such hardware and associated software are well known and are described for example in "Fundamentals of Speech Recognition" by L. R. Rabiner and B. H. Juang, Prentice Hall, 1993.

As is shown in Table I, the error rate (per digit) recognition of connected digits over the telephone network is substantially lower for speech received through a carbon transducer, than for speech received through an electret transducer regardless of the training conditions. Thus, it is apparent from the foregoing experiment that due to the fact that carbon transducers suppress speech information where signal variability is high, speech recognition is improved. The invention advantageously utilized this type of transformation in the feature space created by a carbon transducer to generally improve speech recognition whether a carbon or electret transducer is utilized.

Figure 2:
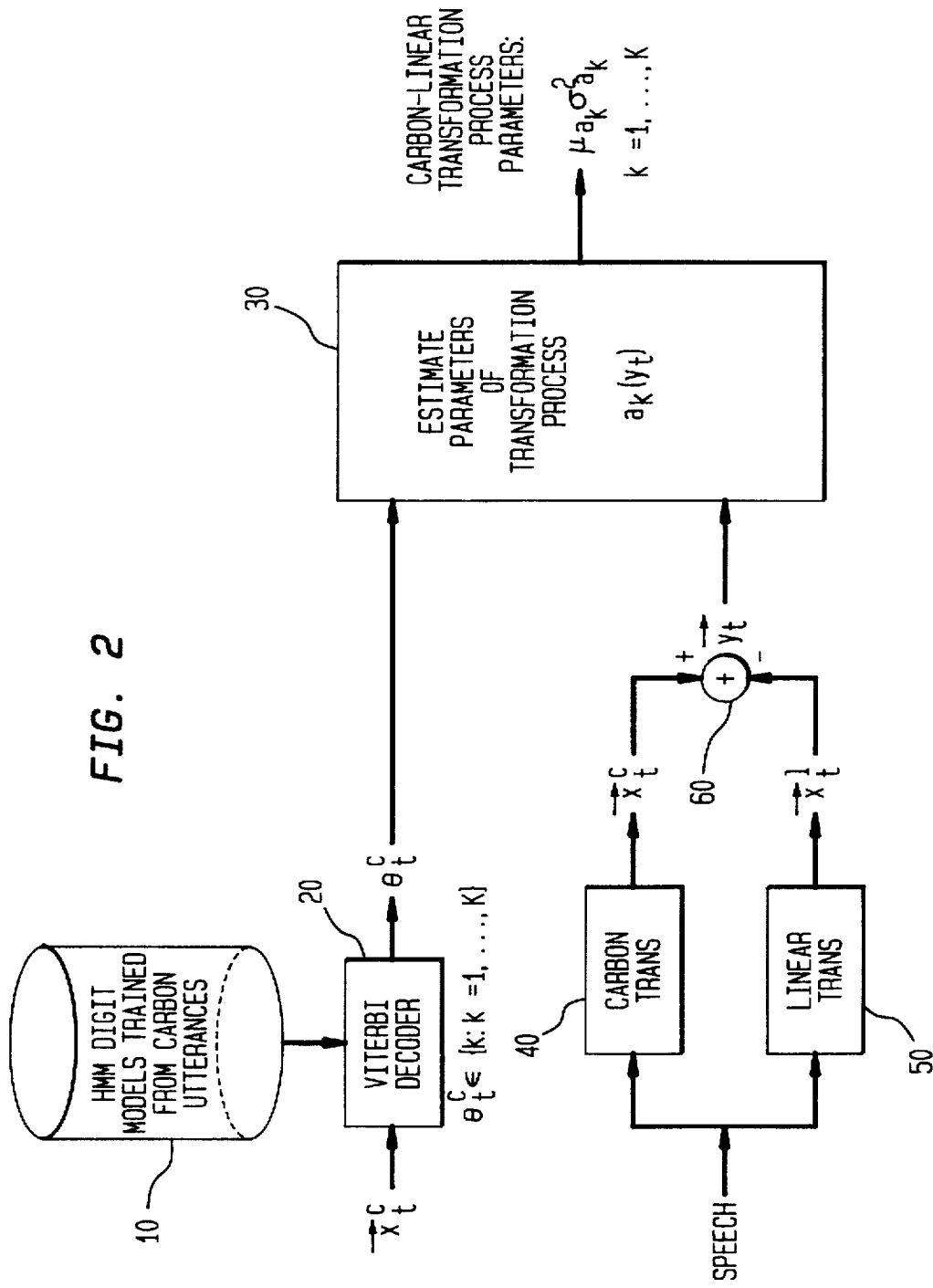
FIG. 2 illustrates one portion of the inventive system that computes a carbon-linear transformation process parameter.

Referring now to FIG. 2, there is shown a system that computes a carbon transducer-linear transducer transformation process. More particularly, the system shown in FIG. 2 is designed to generate carbon-linear transformation parameters in response to speech from both carbon and linear transducers, and using the HMM Models trained from carbon utterances.

Stored at 10, are HMM models trained from carbon utterances. Such HMM models are applied to Viterbi Decoder 20, which type of Decoder is well known in this technical area and is described, in the Rabiner and Juang reference mentioned above.

Speech to be recognized is applied to carbon transducer 40, and linear transducer 50, and the respective transducer outputs are applied to the ASR front-end. Such ASR front-ends are well-known and described, for example, in "Comparison of Parametric Representations for Monosyllabic Word Recognition in Continuously Spoken Sentences" by S. B. Davis and P. Mermelstein, IEEE Transactions of Acoustic Speech and Signal Processing, 1980. The outputs of the ASR front-ends are $\vec{x}_t^c$ which is the cepstrum observation vector spoken through the carbon transducer and an output of $\vec{x}_t^l$ which is the ceptrum observation vector spoken through the linear (electret) transducer.

The observation vector $\vec{x}_t^c$, is applied to the Viterbi Decoder 20. The output of Viterbi Decoder 20, $\theta_t^c$ is applied to block 30, which estimates the parameters of the transformation process. The function performed by block 30 is to estimate $\alpha_k(y_t) \sim N(\mu_{\alpha_k}, \sigma^2_{\alpha_k})$ associated with "carbon-linear" observations decoded in state k for k=1, ... K=total number of states.

The observation vectors $\vec{x}_t^c$ and $\vec{x}_t^l$ are subtracted at block 60 to form $\vec{Y}t$ which is the carbon-linear distortion process also applied to block 30.

Block 30 generates $\mu_{a_k}$ and $\sigma_{a_k}^2$, which are the carbon-linear transformation process parameters with:

$$\mu_{a_k} = \frac{1}{N_k} \sum_{t:\Theta_t=k} \vec{y}_t \text{ and } \sigma_{a_k}^2 = \frac{1}{N_k} \sum_{t:\Theta_t=k} \vec{y}_t \vec{y}_t^T - \mu_{a_k}^2$$

and where $N_k$ is the number of vectors $\vec{Y}_t$ assigned to class K.

The problem of generating the carbon-linear transformation process parameters is treated as a signal recovery problem. The cepstrum vectors derived from the carbon transducer, $\vec{x}_t^c$, are taken as the "desired" signal, and the cepstrum vectors derived from the electret transducer $\vec{x}_t^l$, are taken as the "corrupted" signal. It is assumed that these vectors are realizations of random processes that are related according to $\vec{x}_t^c = \vec{x}_t^l + \vec{y}_t$, where $\vec{y}_t$ represents a simple linear filtering operation. This can be modeled as an additive bias in the mel-frequency cepstrum domain. It is also assumed that $\vec{x}_t^c$ and $\vec{y}_t$ are both represented by Gaussian densities that are tied to the states of the hidden Markov digit models. The parameters of the HMM state dependent Gaussian densities associated with $\vec{y}_t$ are obtained from the simultaneous carbon/electret recordings of the database according to the process illustrated in FIG. 2. Viterbi alignment of each training utterance spoken through a carbon transducer is performed against the known word transcription for the utterance. All frames where $\vec{x}_t^c$ are assigned to state $\Theta_t=k$ are used to estimate the mean, $\vec{\mu}_k$, and variance, $\vec{\sigma}_k^2$ of $\vec{y}_t = \vec{x}_t^c - \vec{x}_t^l$ for state k, which is done in Block 30.

In the particular embodiment shown in FIG. 2, parameters were estimated from a "Stereo Carbon-Electret" database where four speakers spoke triplets of digits simultaneously into two handsets.

In FIG. 2, a transformation vector is estimated for each state of the HMM. The underlying goal was to approximate the highly non-linear characteristics of the carbon transducer using a segmental linear model. It is assumed that over a single HMM state, the transformation is a simple linear filter which can be modeled as an additive bias in the log spectral domain, or in the mel-frequency cepstrum domain.

It is important to note that the parameters of the transformation are estimated from a stereo database where speakers uttered connected digit strings simultaneously through carbon and electret telephone handsets. Hence, the parameters of the transformation were trained completely independent from the utterances that were used to test speech recognition performance. Furthermore, the speakers and the telephone handsets used for training the transformations were also separate from those used during testing.

Figure 3A:
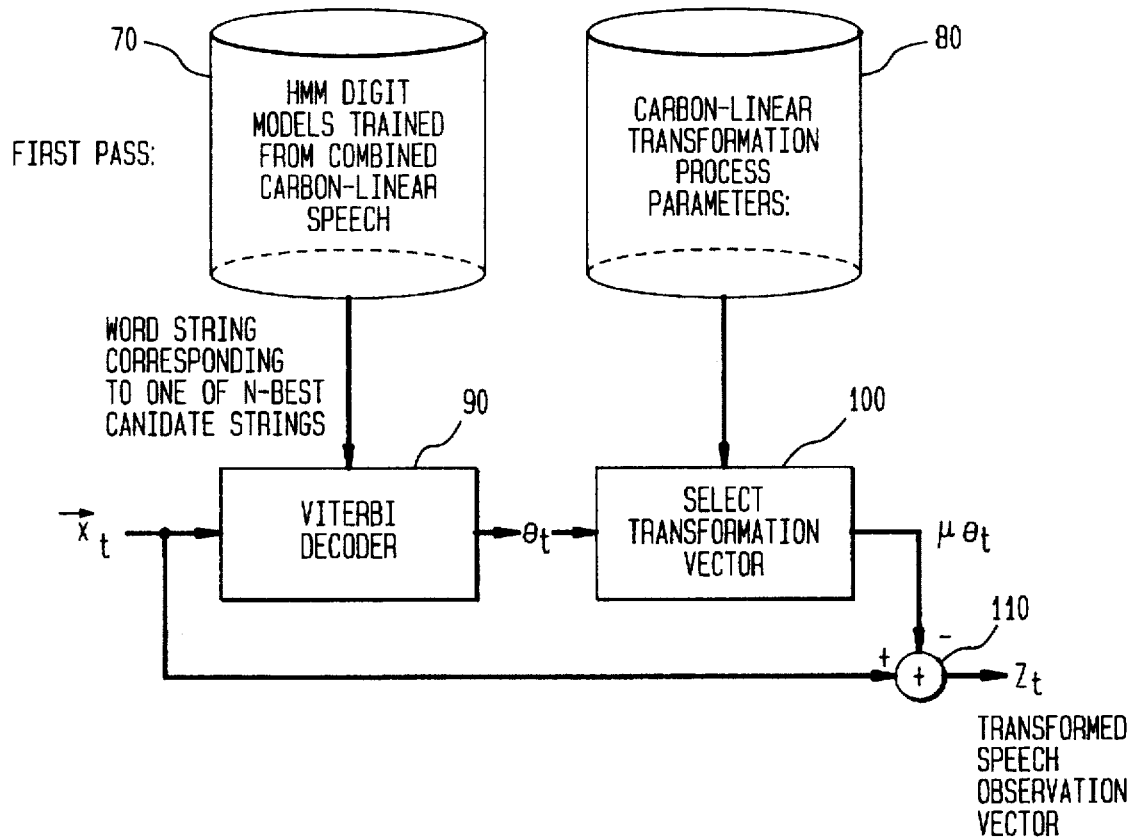
FIGS. 3A and 3B illustrate the remaining portions of the inventive system, in which a transformed speech observation vector is utilized to improve the speech recognition process.
Figure 3B:
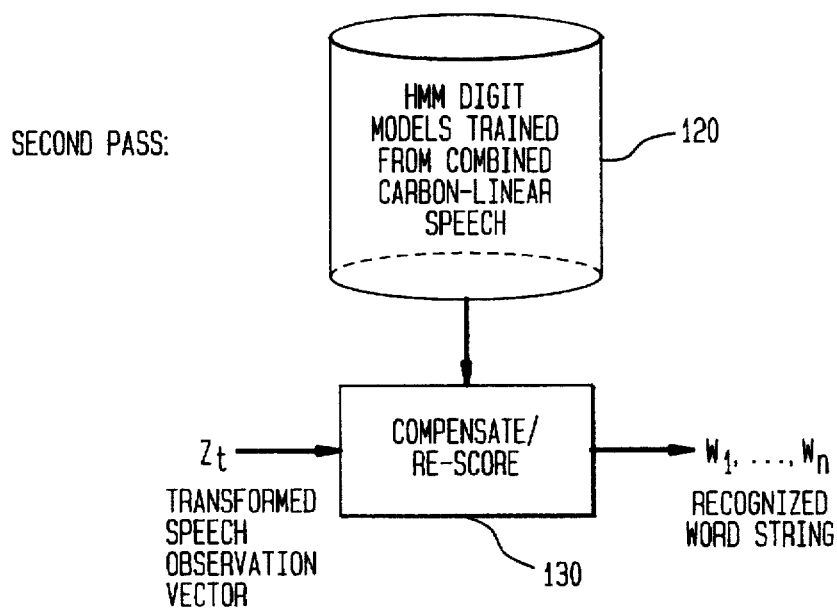

The test utterances were transformed during recognition using the two pass procedure described in FIG. 3A (First Pass) and FIG. 3B (Second Pass). The two pass procedure is utilized for transforming the feature space prior to speech recognition. In the first pass, a state dependent transformation is applied to the input speech. Then, in the second pass, compensation and rescoring are performed on the transformed features.

In FIG. 3A, a list of N most likely string candidates (N-best list) is generated from the original test utterance. Then, a state dependent transformation is performed for each string candidate by replacing each observation $\vec{x}_t^i$ with $\vec{y}_t - \vec{\mu}_{\theta_t}$. Finally, the best string is chosen as the one associated with the transformed utterance with the highest likelihood, as shown in FIG. 3B.

More particularly, HMM models trained from combined carbon-linear speech are stored at block 70. Similarly, the carbon-linear transformation process parameters obtained from block 30 in FIG. 2 are stored in block 80.

The HMM models from block 70 are applied to Viterbi Decoder 90, along with the input test speech observation vector $\vec{X}_t$. The input test speech observation vector is also applied to summation block 110. The output of the Viterbi decoder $\theta_t$ is applied to Select Transformation Vector Block 100, along with the carbon-linear transformation process parameters. Block 100 is a standard look-up table, where the input $\theta_t$ is used as a parameter to access the data stored in block 80.

The output of block 100 is also applied to summation block 110, whose output is $Z_t$, which is the transformed speech observation vectors, providing a plurality of recognition hypothesis.

On the second pass, the transformed speech observation vectors $Z_t$ are applied to Compenate/Rescore Block 130, along with the HMM Digit models (Block 120) trained from the combined carbon-linear speech.

It is to be understood that FIG. 3A produces N recognition hypotheses. However, the best scoring hypothesis may not be the best in terms of speech recognition. Accordingly, in FIG. 3B, a decision is made on the "best" (i.e., most recognizable) recognition hypothesis by rescoring the compensated utterances. For example, suppose that P($\vec{Z}_t^2/\lambda$)>P($\vec{Z}_t^1/\lambda$) or the score of the compensated second candidate was higher than the first. Then, the second candidate would be chosen as additional information was used to reorder the recognition hypotheses.

The output of the speech recognizer 130 is the recognized word string. It must be emphasized that the feature vectors in the test utterances are not used to estimate any aspect of the transformation process. The parameters are obtained strictly from knowledge of the distortion process that existed prior to recognition. The result of the inventive speech recognition procedure is set forth in the digit recognizer error rate shown below in Table II. In Table II, it is to be understood that baseline conditions for Carbon were 1.3 and 2.8 for Electret, while with compensation Carbon would be at 1.0 and Electret at 1.9.

TABLE II

Error Rate (Per Digit)

| Training Condition: | Testing Condition | |
|---|---|---|
| | Carbon | Electret |
| Carbon | 0.8% | 2.1% |
| Electret | 1.7% | 1.9% |
| Combined | 1.0% | 1.9% |

As indicated in Table II, the approach outlined above resulted in substantial improvement in the speech recognition process, when compared to the data shown in Table I. Recognition performance improved not only for the electret, but also for the carbon utterances. Recognition performance improved across the board when Table II is compared with Table I, and is even approximately the same (1.6% vs. 1.7%) for the mismatched electret training and carbon testing case.

It should be particularly noted that overall performance was significantly improved for both the matched and mismatched case, while the error rate for carbon data is still (after compensation) almost half of the error rate for the electret data (matched case).

Although the present invention and its advantages have been described in detail, it should be understood that various changes, substitutions and alternatives can be made herein without departing from the spirit and scope of the invention.

We claim:

1. An improved speech recognition system for recognizing an input speech utterance comprising, means for generating transformation process parameters in response to selected characteristics derived from prior speech inputs obtained from a plurality of different types of microphones, said transformation parameters including a information indicative of differences between characteristic properties of a carbon microphone and another of said different types of microphones;

means for utilizing said transformation process parameters, in conjunction with selected digitized speech models to generate a sequence of transformation vectors, each transformation vector being a function of a corresponding portion of said input speech utterance, said digitized speech models being generated from combined prior speech inputs received from said different types of microphones, means for generating a sequence of transformed speech observation vectors based on said input speech utterance in conjunction with corresponding transformation vectors; and, means for applying said digitized speech models to a speech recognizer, along with said sequence of transformed speech observation vectors to recognize individual words from said input speech utterance, whereby speech recognition is improved.

2. An improved speech recognition system in accordance with claim 1, wherein said means for generating transformation process parameters includes means for accessing and utilizing stored digitized speech models trained from prior speech inputs stemming from one of said different types of microphones, and accessing and utilizing combined prior speech inputs stemming from two or more of said different types of microphones.

3. An improved speech recognition system in accordance with claim 2, wherein there is further included a first Viterbi decoder to which said digitized models trained from prior speech inputs stemming from one of said different types of microphones is applied prior to access by said generating means.

4. An improved speech recognition system in accordance with claim 3, wherein said utilizing means includes means for accessing and utilizing stored digitized speech models trained from prior speech inputs stemming from two or more of said different types of microphones, and for applying said digitized speech models to a second Viterbi decoder.

5. An improved speech recognition system in accordance with claim 1, wherein said different types of microphones includes a carbon microphone and a linear microphone.

6. A method for recognizing an input speech utterance comprising the steps of:

a) generating transformation process parameters in response to selected characteristics derived from prior speech inputs obtained from a plurality of different types of microphones, said transformation parameters including information indicative of differences between characteristic properties of a carbon microphone and another of said different types of microphones;

b) generating a sequence of transformation vectors utilizing said transformation process parameters in conjunction with selected digitized speech models, each of said plurality of transformation vectors being a function of a corresponding portion of said input speech utterance, said digitized speech models being generated from combined prior speech inputs received from said different types of microphones, c) generating a sequence of transformed speech observation vectors based on said input speech utterance in conjunction with corresponding transformation vectors; and, d) applying said digitized speech models to a speech recognizer, along with said sequence of transformed speech observation vectors to recognize individual words from said input speech utterance, whereby speech recognition is improved.

7. A method for recognizing speech in accordance with claim 6, wherein said generating step a) further includes accessing and utilizing stored digitized speech models trained from prior speech inputs stemming from one of said different types of microphones, and accessing and utilizing combined prior speech inputs stemming from two or more of said different types of microphones.

8. A method for recognizing speech in accordance with claim 7, wherein prior to step a) the step of applying digitized models trained from prior speech inputs stemming from one of said different types of microphones to a first Viterbi decoder for estimating said transformation process parameters.

9. A method for recognizing speech in accordance with claim 7, wherein said step b) of generating a sequence of transformation vectors includes accessing and utilizing stored digitized speech models trained from prior speech inputs stemming from two or more of said different types of microphones and applying said digitized speech models to a second Viterbi decoder.

10. A method for recognizing speech in accordance with claim 6, wherein said different types of microphones includes a carbon microphone and a linear microphone.

* * * * *